United States Patent [19]

Tsujimura et al.

[11] Patent Number: 4,570,872
[45] Date of Patent: Feb. 18, 1986

[54] SEAT BELT RETRACTOR

[75] Inventors: Harutoshi Tsujimura, Yokohama; Ken Kamijo, Zushi, both of Japan

[73] Assignee: Nissan Motor Co., Ltd., Yokohama, Japan

[21] Appl. No.: 479,015

[22] Filed: Mar. 25, 1983

[30] Foreign Application Priority Data

Apr. 26, 1982 [JP] Japan ................................. 57-69956

[51] Int. Cl.⁴ ........................ A62B 35/00; B65H 75/48
[52] U.S. Cl. ....................................... 242/107; 280/807
[58] Field of Search ......... 242/107, 107.4 R, 107.4 E; 280/806–808; 297/475–480

[56] References Cited

U.S. PATENT DOCUMENTS

| | | | |
|---|---|---|---|
| 3,771,742 | 11/1973 | Okada | 242/107.4 R |
| 3,880,364 | 4/1975 | Andres | 242/107.4 R |
| 3,984,063 | 10/1976 | Knieriemen | 242/107.4 R X |
| 4,382,563 | 5/1983 | Morita | 242/107.4 R X |

FOREIGN PATENT DOCUMENTS

| | | |
|---|---|---|
| 2914235 | 10/1979 | Fed. Rep. of Germany ... 242/107.4 R |
| 111933 | 9/1978 | Japan .......................... 242/107.4 R |

*Primary Examiner*—John M. Jillions
*Attorney, Agent, or Firm*—Schwartz, Jeffery, Schwaab, Mack, Blumenthal & Evans

[57] ABSTRACT

In an electrically actuated seat belt retractor including a belt take-up shaft on which a seat belt is retractable, and an electric motor which rotates the belt take-up shaft in at least one of the belt retracting direction and the belt feeding direction when energized, there is disposed an extra belt retracting device which can effect the belt retracting work of the belt take-up shaft when the electric motor fails to run.

14 Claims, 9 Drawing Figures

SEAT BELT RETRACTOR

BACKGROUND OF THE INVENTION

1. Field of the Invention

The present invention relates to a seat belt retractor used in a motor vehicle, and more particularly to a retractor of the type in which at least the belt retracting work is effected by an electric motor mounted to the retractor.

2. Description of the Prior Art

Nowadays, there has been proposed a so-called "electrically actuated seat belt retractor" for simplifying the belt handling work imposed to a belt user, in which at least the belt retracting work is effected by an electric motor in response to an instruction signal issued from a control unit. One of the retractors of this type is disclosed in secondarily laid-open Japanese Patent Application Specification No. 52-9891.

However, this type retractor has suffered from the drawback that as the belt retracting work (and/or the belt feeding work) is achieved by the electric motor per se, and upon failure of the electric circuit for the motor, the motor fails to effect the belt retracting work (and/or the belt feeding work). Thus, in such a trouble case, the belt user has to bear the obstructive unretracted seat belt all the time during his or her drive.

SUMMARY OF THE INVENTION

It is therefore an essential object of the present invention to provide an electrically actuated seat belt retractor which has an extra belt retracting device to assure the belt retracting work even when the electric circuit of the retractor fails to operate.

According to the present invention, there is provided a seat belt retractor for selectively retracting and feeding a seat belt, which comprises a belt take-up shaft on which the seat belt is retractable, first means for rotating the belt take-up shaft in at least one of the belt retracting direction and the belt feeding direction when operated, second means for rotating the belt take-up shaft in the belt retracting direction when operated, and switch means for selectively operating the first and second means.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
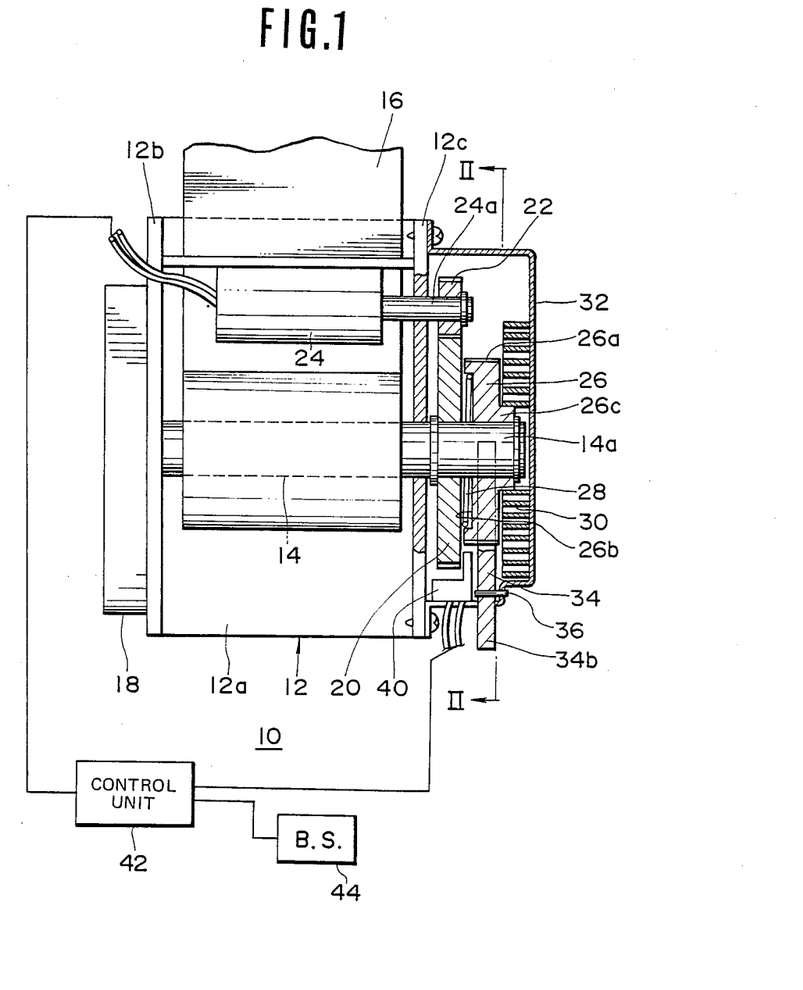
FIG. 1 is a sectional view of a seat belt retractor of a first embodiment of the present invention.
Figure 2:
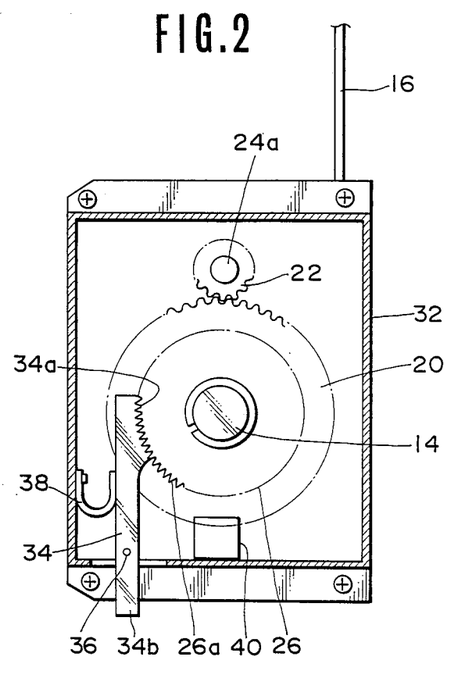
FIG. 2 is a sectional view taken along the line II—II of FIG. 1.

Referring to FIGS. 1 and 2, there is shown a seat belt retractor 10 which is a first embodiment of the present invention. The retractor 10 comprises a housing 12 having a base wall 12a and two spaced side walls 12b and 12c which extend from the base wall 12a. A belt take-up shaft 14 spans across the side walls 12b and 12c in a manner to be rotatable about the axis thereof relative to the housing 12. A seat belt 16 is wound on the shaft 14 with its one end secured to the same. Although not shown in the drawings, a known emergency locking mechanism is mounted to the side wall 12b to associate with the belt take-up shaft 14, which inhibits the feeding of the belt 16 from the retractor 10 when sensing a certain shock applied to the retractor 10. Designated by numeral 18 is a circular cover for the emergency locking mechanism.

As is seen from FIG. 1, the shaft 14 has a coaxial extension 14a which is projected outwardly from the side wall 12c. An external gear 20 is coaxially and securely mounted on the shaft extension 14a to rotate therewith. Engaged with the external gear 20 is a pinion gear 22 securely mounted on a drive shaft 24a of an electric motor 24 which is fixed to the housing 12. Thus, when the emergency locking mechanism is in its inoperative condition, the driving force generated by the motor 24 is operatively transmitted to the external gear 20 through the pinion gear 22 thereby to rotate the shaft 14. A wheel 26 having external teeth 26a is slidably rotatably mounted on the shaft extension 14a beside the external gear 20, so that the wheel 26 is rotatable about the axis of the shaft 14 relative to the shaft 14. The wheel 26 is formed, at one side thereof facing the external gear 20, with a concentric recess 26b. A coil spring 28 is received in the recess 26b and axially compressed between the wheels 26 and the external gear 20, so that the wheel 26 can rotate together with the external gear 20 so long as any external obstruction force is not applied thereto. As is seen, the wheel 26 is formed at the other side thereof with a concentric smaller diameter projected portion 26c. Disposed about the portion 26c is a spiral spring 30 which has an inner end secured to the portion 26c and an outer end fixed to a rectangular cover 32 which is bolted to the housing side wall 12c to cover the installed parts. As will become clear as the description proceeds, the spiral spring 30 acts as an extra belt retracting device which stores energy to retract the belt 16 when turned in a given direction.

As is best seen from FIG. 2, a stopper arm 34 is partially housed in the cover 32 with its one portion 34b projected outwardly from the cover 32. The stopper arm 34 is pivotally supported by the cover 32 through a pivot pin 36. The other end portion, that is the upper end portion in the drawing, of the stopper arm 34 is formed with teeth 34a which are engageable with the external teeth 26a of the wheel 26 to block rotation of the same when the stopper arm 34 inclines toward the wheel 26. A pre-loaded leaf spring 38 is secured at its one end to the cover 32 having the other end abutting on the back of the stopper arm 34, so that the stopper arm 34 is biased in a direction to engage with the wheel 26, that is, in the direction to block the rotation of the wheel 26. The teeth 26a of the wheel 26 and teeth 34a of the stopper arm 34 are formed into a saw-teeth shape so that upon engagement of the stopper arm 34 with the wheeel 26, only a rotation of the wheel 26 in the same direction (clockwise direction in FIG. 2) as that in which the belt take-up shaft 14 rotates when winding thereon the seat belt 16 is blocked, while permitting a rotation of the wheel 26 in the same direction (counterclockwise direction in FIG. 2) as that in which the shaft 14 rotates when feeding the belt 16 therefrom. With this construction, when the belt take-up shaft 14 is rotated in the direction to feed the belt 16 therefrom, the wheel 26 rotates together with the shaft 14 due to the frictional engagement of the coil spring 28 to both the external gear 20 and the wheel 26. By the rotation of the wheel 26, the return spring 30 is wound to store energy which can rotate the wheel 26 in the reversed direction (clockwise direction in FIG. 2). When, however, the belt feeding rotation of the shaft 14 comes to a predetermined degree wherein the energy stored by the return spring 30 shows a predetermined large value, the coil spring 28 begins to slip thereby failing to effect the transmission of the rotating motion of the external gear 20 to the wheel 26. Thus, after this, the return spring 30 is no longer wound up thereby keeping the stored energy at a constant value. Under this condition, the reversed rotation of the wheel 26, which would be caused by the stored energy of the spring 30, is blocked by the locking engagement between the teeth 34a of the stopper arm 34 and the teeth 26a of the wheel 26.

Designated by numeral 40 is a known belt position sensor which senses the angular position of the external gear 20 for monitoring the length of the seat belt 16 practically retracted by the shaft 14. The information signal from the sensor 40 is fed to a control unit 42 into which another information signal from a buckle switch 44 is also fed. The buckle switch 44 produces a signal representative of engagement and/or disengagement between a buckle and a tongue member of the seat belt 16. The control unit 42 supplies the electric motor 24 with an instruction signal by processing the information signals. The electric circuit comprising the sensor 40, the buckle switch 44, the motor 24 and the control unit 42 is so designed that when the buckle and tongue member of the seat belt 16 are disengaged from each other for releasing the seat occupant, the motor 24 is energized to rotate the belt take-up shaft 14 in the belt retracting direction, and when, under this belt retracting motion, the sensor 40 senses the belt 16 being sufficiently retracted by the shaft 14, the motor 24 is de-energized to stop the belt retracting rotation of the shaft 14. The circuit of a type as stated above is substantially disclosed in the secondarily laid-open Japanese Patent Application Specification No. 52-9891.

Operation of the seat belt retractor 10 of this first embodiment will be described next. For ease with which explanation is made, the following description will commence with respect to a belt-unused condition wherein the belt 16 is kept retracted sufficiently by the shaft 14.

When, for use of the seat belt 16, the seat occupant picks up the tongue member and pulls the same toward the front of him or her, the belt 16 is drawn out from the retractor 10 rotating the shaft 14, external gear 20, the drive shaft 24a of the motor 24 and also the wheel 26. (As has been described hereinafore, the rotation of the wheel 26 in this belt feeding direction causes the return spring 30 to store energy. The energy thus stored is used in an after-mentioned trouble case.) The occupant restraining function is achieved when the tongue member and the buckle are coupled.

When, under this belt-used condition, a certain shock is applied to the retractor 10 due to, for example, a vehicle collision, the emergency locking mechanism incased in the cover 18 locks instantly the shaft 14 thereby suppressing the drawing the belt 16 from the retractor 10. Thus, the belt wearer is protected safely from being thrown forward.

When the belt wearer uncouples the tongue member and buckle for his or her release, the control unit 42 functions to energize the motor 24 in response to the information signal issued from the buckle switch 44, so that the released belt 16 is retracted by the shaft 14. When the length of the belt 16 practically wound on the shaft 14 comes to the predetermined degree, the control unit 42 de-energizes the motor 24 in response to the information signal from the belt position sensor 40. Thus, the belt 16 is neatly retracted in the retractor 10.

In the present invention, the following advantageous function is additionally achieved, which is expected when the electric circuit fails to operate, in particular, when the electric motor 24 does not run even when the belt wearer uncouples the tongue and buckle.

In such a trouble case as mentioned hereinabove, the seat occupant handles the outwardly projected end 34b of the stopper arm 34 to disengage the teeth 34a thereof from the wheel 26 against the force of the leaf spring 38. For the time while the stopper arm 34 is disengaged from the wheel 26, the wheel 26 is rotated by the stored energy of the return spring 30 in the clockwise direction in FIG. 2. By the presence of the coil spring 28, the rotation of the wheel 26 induces simultaneous rotation of the external gear 20 and thus the shaft 14 in the same direction, that is, in the belt retracting direction. Thus, the belt 16 can be retracted even in the above-stated trouble case.

Figure 3:
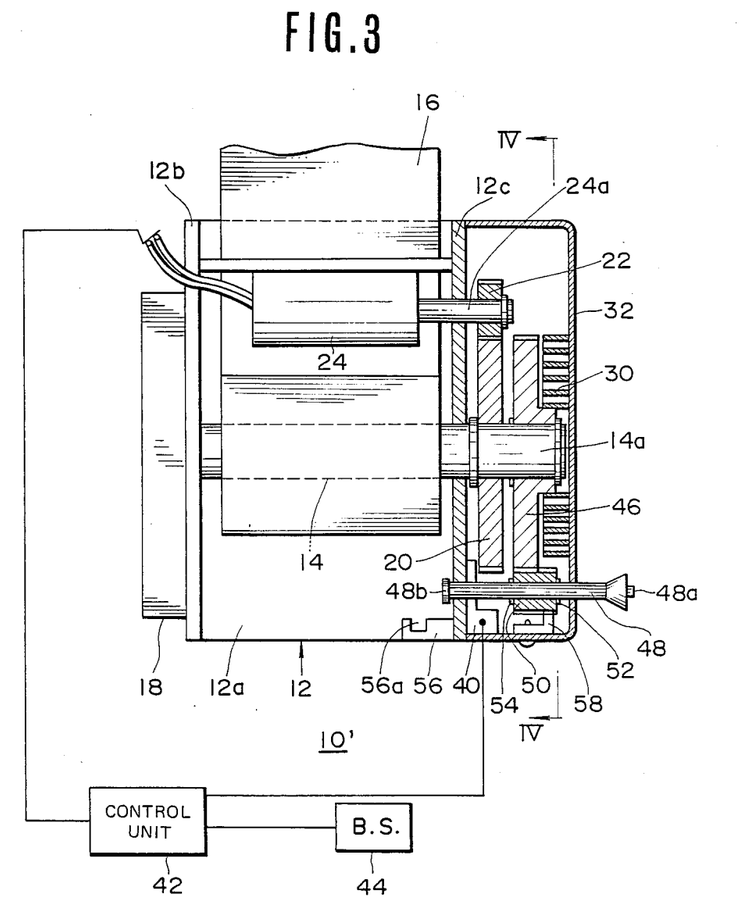
FIG. 3 is a sectional view of a seat belt retractor of a second embodiment of the present invention.
Figure 4:
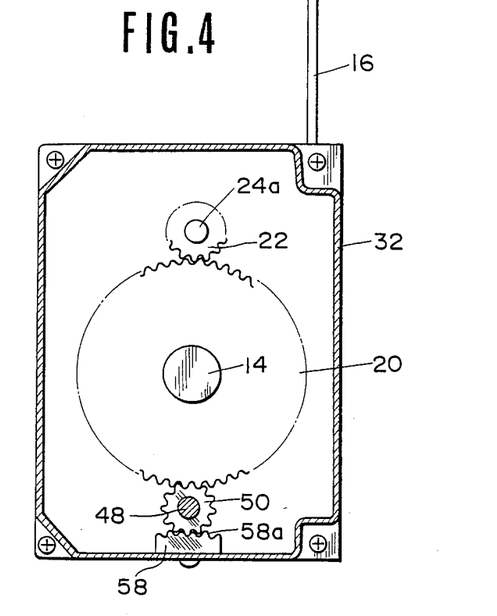
FIG. 4 is a sectional view taken along the line IV—IV of FIG. 3, with a spiral spring omitted from the drawing for clarification of the drawing.
Figure 5:
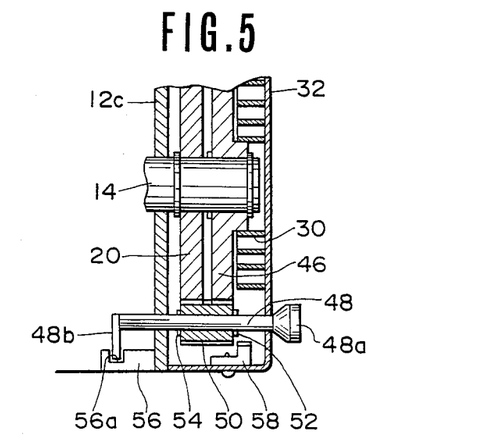
FIG. 5 is a partial, enlarged and sectional view of the retractor of the second embodiment, showing one operating condition of the retractor.

Referring to FIGS. 3 to 5, there is shown a second embodiment of the present invention. Identical parts to those of the first embodiment are designated by the same numerals and detailed explanation of them will be omitted from the following description.

The seat belt retractor 10' of the second embodiment comprises, similar to the retractor 10 of the first embodiment, a housing 12, a belt take-up shaft 14, a known emergency locking mechanism incased in a cover 18, an external gear 20, a pinion gear 22, an electric motor 24 and an electric circuit (40, 42, 44) which are assembled in substantially the same manner as in the above-mentioned first embodiment.

In the second embodiment, a wheel 46 larger than the wheel 26 of the first embodiment is employed. The wheel 46 is rotatably mounted on the shaft extension 14a beside the external gear 20, and has a diameter and a gear pitch which are identical to those of the external gear 20. Similar to the first embodiment, the rotation of the wheel 46 in a given direction causes a spiral spring 30 to store energy.

A shiftable shaft 48 is carried by the housing side wall 12c and the cover 30 to extend in parallel with the belt take-up shaft 14. The shaft 48 has a sufficient length to be axially movable relative to the side wall 12c and the cover 30. A knob 48a is formed on the outwardly projected end of the shaft 48, while, a locking arm 48b is connected to the inwardly projected end of the shaft 48. A pinion gear 50 is rotatably mounted on the shaft 48. The axial movement of the pinion gear 50 relative to the shaft 48 is suppressed by two snap rings 52 and 54 fixed to the shaft 48. The axial length of the pinion gear 50 is so determined that it is engageable with both the external gear 20 and the wheel 46 at the same time when assuming a given position as shown in FIG. 5. The shaft 48 is axially movable from a first position shown in FIG. 3 where the pinion gear 50 engages only the wheel 46 to a second position shown in FIG. 5 where the pinion gear 50 engages both the wheel 46 and the external gear 20. As is understood from FIG. 5, the shaft 48 can be locked in the second position against the axial movement thereof when the locking arm 48b is engaged with a groove 56a of a catch member 56 secured to the housing 12. The engagement and disengagement between locking arm 48b and the catch member 56 are easily achieved by turning the knob 48a of the shaft 48 about its axis. Designated by numeral 58 is a stopper which is secured to the cover 32 and has teeth 58a to which the pinion gear 50 is engageable. The stopper 58 is so arranged that it can engage the pinion gear 50 only when the latter assumes the first position as shown in FIG. 3. Thus, it will be appreciated that when the shaft 48 and thus the pinion gear 50 assume the first position of FIG. 3, the wheel 46 is locked against rotation, and when they assume the second position of FIG. 5, the motion transmission between the external gear 20 and the wheel 46 is achieved through the pinion gear 50.

Since the normal operation of the retractor 10' of this second embodiment is substantially the same as that of the first embodiment, explanation of it will be omitted from the following.

In this second embodiment, however, it is necessary to store energy in the return spring 30 before the actual use of the seat belt 16.

The energy storing is carried out by taking the following steps:

First, the shaft 48 is moved to the second position of FIG. 5 and locked by engaging the locking arm 48b with the groove 56a of the catch member 56. With this, the wheel 46 and the external gear 20 becomes geared through the pinion gear 50, as is understood from FIG. 5. Then, the belt 16 is drawn from the retractor 10', rotating the shaft 14, the external gear 20 and thus the wheel 46 thereby winding the returning spring 30 to store energy. When the length of the belt 16 thus drawn comes to a certain degree, the shaft 48 is handled to unlock and is moved to the first position as shown in FIG. 3 thereby to lock the wheel 46 and thus the return spring 30. With these steps, the energy for turning the shaft 14 in the belt retracting direction is stored in the return spring 30. Thus, usually, the shaft 14 is held in the first position for keeping the energy of the return spring 30.

When, due to a trouble in the electric circuit, the electric motor 24 fails to run even when the belt wearer uncouples the tongue and the buckle for his or her release, the shaft 48 is manually moved to the second position and locked in the same manner as is stated hereinabove. With this movement, the wheel 46 starts to rotate by the stored energy of the return spring 30, rotating the external gear 20 and thus the shaft 14 in the belt retracting direction. Thus, the belt 16 can be retracted even in the above-mentioned trouble case.

Referring to FIGS. 6 to 9, there is shown a third embodiment of the present invention. Similar to the case of the second embodiment, identical parts to those of the first embodiment are designated by the same numerals and detailed explanation of them will be omitted from the following description.

Figure 6:
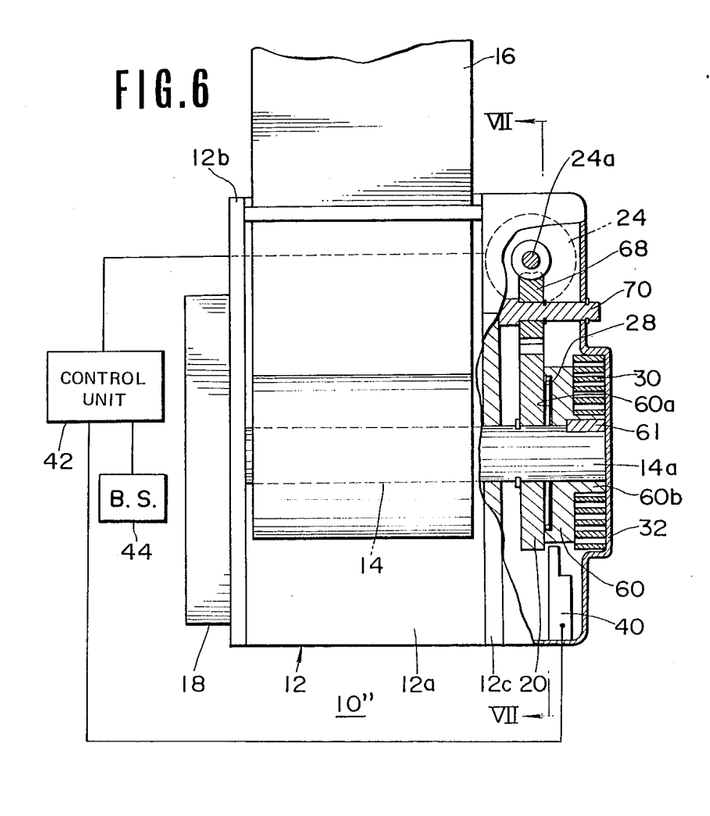
FIG. 6 is a sectional view of a seat belt retractor of a third embodiment of the present invention.

The seat belt retractor 10" of this third embodiment comprises, similar to the retractor 10 of the first embodiment, a housing 12, a belt take-up 14, a known emergency locking mechanism housed in a cover 18, an external gear 20 and an electric circuit (40, 42, 44) which are assembled in a manner similar to the above-mentioned first embodiment.

In the third embodiment, the external gear 20 is rotatably mounted on the shaft extension 14a. A wheel 60 having no external teeth is employed. Denoted by numeral 61 is a key for securing the wheel 60 to the shaft extension 14a. The wheel 60 is securely disposed on the shaft extension 14a beside the external gear 20. The wheel 60 is formed, at one side thereof facing the external gear 20, with a concentric recess 60a for receiving therein a coil spring 28 which is axially compressed between the wheel 60 and the external gear 20. Thus, the wheel 60 is rotatable together with the external gear 20 so long as any external obstruction force is not applied thereto. The wheel 60 is formed at the other side thereof with a concentric smaller diameter projected portion 60b. Disposed about the portion 60b is a spiral spring 30 which has an inner end fixed to the portion 60b and an outer end fixed to a rectangular cover 32 which is bolted to the housing side wall 12c to cover the installed parts.

Figure 7:
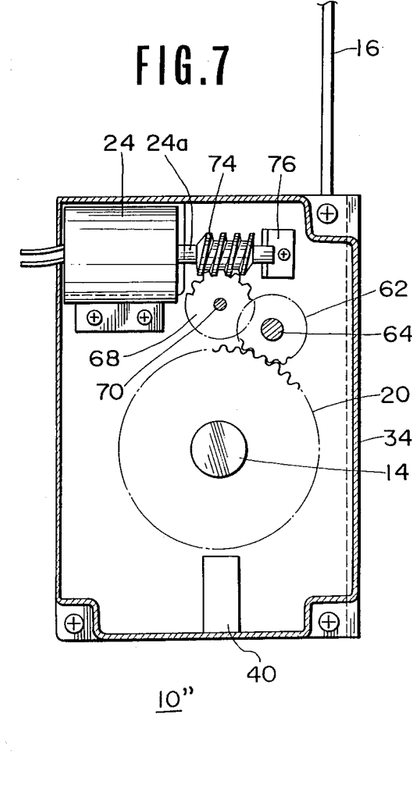
FIG. 7 is a sectional view taken along the line VII—VII of FIG. 6.
Figure 8:
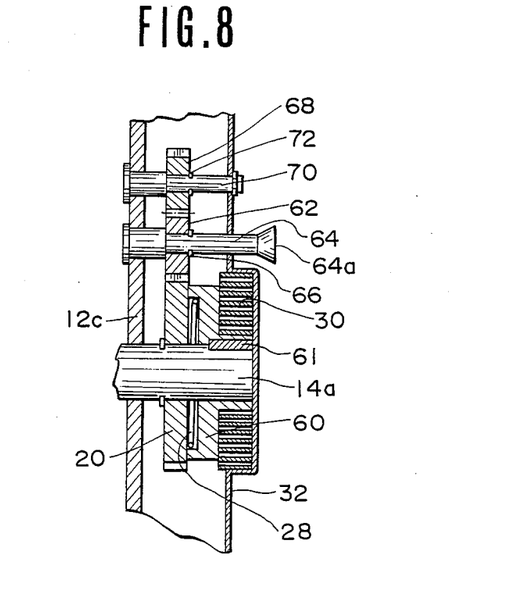
FIGS. 8 and 9 are partial, enlarged and sectional views of the retractor of the third embodiment, showing respectively different operating conditions of the retractor.
Figure 9:
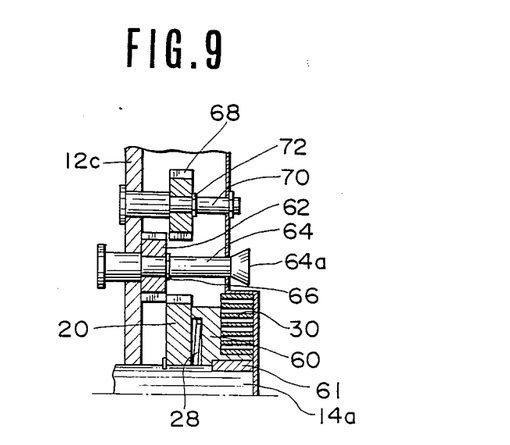

As is seen from FIGS. 7, 8 and 9, a pinion gear 62 is journaled on a shiftable shaft 64 which is axially movably carried by the housing side wall 12c and the cover 32. As is seen from FIGS. 8 and 9, a knob 64a is formed on the outwardly projected end of the shaft 64 for easy handling of the shaft 64. The axial movement of the pinion gear 62 relative to the shaft 64 is suppressed by a snap ring 66 fixed to the shaft 64. The shaft 64 is axially movable from a position as shown in FIG. 8 where the pinion gear 62 engages with the external gear 20 to another position as shown in FIG. 9 where the pinion gear 62 disengages from the external gear 20. As is seen from the drawing, another pinion gear 68 is journaled on a shaft 70 which is unmovably carried by the housing side wall 12c and the cover 32 beside the shiftable shaft 64. The axial movement of the pinion gear 68 relative to the shaft 70 is suppressed by a snap ring 72 fixed to the shaft 70. The shaft 70 is so arranged that the pinion gear 68 journaled thereon engages with the pinion gear 62 only when the latter assumes the position to engage with the external gear 20, that is, when the shaft 64 assumes the position as shown in FIG. 8. As is best seen from FIG. 7, the pinion gear 68 engages constantly with a worm gear 74 carried on a drive shaft 24a of an electric motor 24. The motor 24 and a supporter 76 for the drive shaft 24a are bolted to the housing side wall 12c.

Since the normal operation of the retractor 10" of this third embodiment is substantially the same as that of the first embodiment, explanation of it will be omitted from the following. In this third embodiment, however, the motion transmission from the pinion gear 62 to the belt take-up shaft 14 is made through the external gear 20 and the wheel 60 in this order. By the nature of mutual engagement between the pinion gear 68 and the worm gear 74, the gears 20, 62 and 68, assuming the condition of FIG. 8, are kept stationary or locked so long as the motor 24 is deenergized. However, even under this condition, the rotation of the wheel 60 and thus that of the belt take-up shaft 14 are permitted because of the frictional but movable engagement between the wheel 60 and the locked external gear 20.

In this third embodiment, the shiftable shaft 64 is usually located in the operative position of FIG. 8. When the seat occupant draws the seat belt 16 for the actual use of the belt 16, the belt take-up shaft 14 and thus the wheel 60 are rotated together leaving the external gear 20 locked. By this rotation, the spiral spring 30 becomes wound thereby storing energy. When the belt drawing movement stops due to, for example, completion of the coupling between the tongue member and the buckle member, the energy thus stored in the return spring 30 produces a force in the direction tending to rotate the belt take-up shaft 14 in the belt retracting direction. However, in this condition, the frictional engagement of the coil spring 28 to both the external gear 20 and the wheel 60 prevents the rotation of the wheel 60 and thus that of the belt take-up shaft 14. This means that the energy now stored in the return spring 30 is left unchanged.

In a case where, due to trouble in the electric circuit, the electric motor 24 fails to run even when the belt wearer uncouples the tongue and the buckle for his or her release, the shiftable shaft 64 is manually moved to the inoperative position of FIG. 9. With this movement, the locked condition of the gear 20 is eliminated, so that the belt take-up shaft 14 and the wheel 60 start to rotate together with the gear 20 by the stored energy of the return spring 30, in the belt retracting direction. Thus, the belt 16 can be retracted in the retractor 10'' even in the above-mentioned trouble case.

Now, it is to be noted that in the above-mentioned first embodiment if the electric circuit is designed not only to effect the above-mentioned control, but also to rotate the belt take-up shaft 14 in the belt "feeding" direction for providing a belt slack after completion of the engagement between the buckle and the tongue member, the energy storing work before the actual use of the seat belt 16 is not necessary. In fact, in this case, the energy stored by the return spring 30 is assured once the shaft 14 is rotated in the belt feeding direction by the motor 24. Thus, in this case, it is only required to handle the stopper 34 when the motor 24 fails to rotate the belt take-up shaft 14 in the belt retracting direction. Of course, such improved electric circuit is applicable to the second and third embodiments. In these cases, the initial energy storing of the return spring 30 may be effected by the electric motor 24.

We claim:

1. A seat belt retractor for selectively retracting and feeding a seat belt, comprising:
    a belt take-up shaft on which said seat belt is retractable;
    first means, comprising an electric motor, for rotating said belt take-up shaft in at least one of the belt retracting direction and the belt feeding direction when operated;
    second means, comprising a first spring, for rotating said belt take-up shaft in the belt retracting direction when released; and
    switch means for selectively operating said first and second means, said switch means including an inner structure comprising means, when actuated, for releasing said first spring to rotate said belt take-up shaft in the belt retracting direction and an outer structure which projects outwardly from the retractor so as to be easily manipulated from outside the retractor, said outer structure comprising a manually movable member for actuating said releasing means, wherein said first means further comprises a gear train which is arranged to transmit the motion of said electric motor to said belt take-up shaft, and in which said second means further comprises a motion transmitting mechanism which is constructed to wind said first spring for storing therein energy when the belt take-up shaft is rotated in the belt feeding direction and to transmit a rotating motion created by the stored energy of the spiral spring to the belt take-up shaft to rotate the same in the belt retracting direction.

2. A seat belt retractor as claimed in claim 1, in which said gear train comprises an external gear securely mounted on said belt take-up shaft, and a pinion gear securely mounted on a drive shaft of said electric motor, said external gear and said pinion gear being constantly engaged to rotate together.

3. A seat belt retractor as claimed in claim 2, in which said motion transmission mechanism of said second means comprises a wheel rotatably mounted on said belt take-up shaft, and a coil spring axially compressed between said external gear and said wheel so that said wheel is rotatable with said external gear so long as any external force is not applied thereto, said wheel carrying an inner end of said first spring which has an outer end secured to a stationary member of said retractor.

4. A seat belt retractor as claimed in claim 3, in which said wheel is formed with external teeth which are engageable with said switch means for blocking the rotation of said wheel relative to said shaft.

5. A seat belt retractor as claimed in claim 4, in which said switch means comprises a stopper arm swingably connected to a stationary portion of said retractor, said stopper arm being formed at its one end with teeth which are engageable with the external teeth of said wheel, the teeth of said wheel and the teeth of said stopper arm being formed into a saw-teeth shape so that upon engagement of the stopper arm with the wheel, only a rotation of the wheel in the same direction as that in which the belt take-up shaft rotates when winding thereon the seat belt is blocked, while permitting a rotation of the wheel in the same direction as that in which the belt take-up shaft rotates when feeding the belt therefrom.

6. A seat belt retractor as claimed in claim 5, in which said stopper arm is biased by biasing means in a direction to engage the teeth thereof with the teeth of the wheel.

7. A seat belt retractor as claimed in claim 2, in which said motion transmission mechanism of said second means comprises a toothed wheel which is rotatably mounted on said belt take-up shaft and has a diameter and a gear pitch which are identical to those of said external gear, and a pinion gear which has an axial length to be engageable with both the toothed wheel and said external gear at the same time to effect the simultaneous rotation of them, said toothed wheel carrying an inner end of said first spring which has an outer end secured to a stationary member of the retractor.

8. A seat belt retractor as claimed in claim 7, in which said pinion gear is rotatably but axially unmovably mounted on a shiftable shaft which is a part of said switch means, said shiftable shaft being movable from a position where said pinion gear engages only with said toothed wheel to another position where said pinion gear engages with both the toothed wheel and the external gear.

9. A seat belt retractor as claimed in claim 8, further comprising a stopper which is secured to a stationary portion of said retractor and has teeth which are engageable with said pinion gear to lock the same when the pinion gear engages with only the toothed wheel.

10. A seat belt retractor as claimed in claim 9, further comprising a shaft locking device which locks said shiftable shaft when the shaft is in the position where the pinion gear engages with both the toothed wheel and the external gear.

11. A seat belt retractor as claimed in claim 1, in which said gear train comprises an external gear rotatably mounted on said belt take-up shaft, a pinion gear engaged with said external gear, another pinion gear engaged with said pinion gear, and a worm gear securely mounted on a drive shaft of said electric motor and engaged with said another pinion gear.

12. A seat belt retractor as claimed in claim 11, in which said motion transmission mechanism of said second means comprises a wheel securely mounted on said belt take-up shaft, and a coil spring axially compressed between said external gear and said wheel so that said wheel is rotatable with said external gear so long as any external force is not applied thereto, said wheel carrying an inner end of said first spring which has an outer end secured to a stationary member of said retractor.

13. A seat belt retractor as claimed in claim 12, in which said pinion gear positioned between said external gear and said another pinion gear is rotatably but axially unmovably mounted on a shiftable shaft which is a part of said switch means, said shiftable shaft being shiftable from a position where said pinion gear engages both the external gear and the another pinion gear to another position where the pinion gear disengages from both of them.

14. A seat belt retractor for selectively retracting and feeding a seat belt, comprising:
a belt take-up shaft attached to said seat belt, said belt take-up shaft being rotatable for retracting and feeding said seat belt;
first means for producing a powered complete retraction of said seat belt, said first means comprising an electric motor connected to said shaft and circuit means for energizing said motor to retract said seat belt; and
auxiliary means for completely retracting said seat belt when said first means are inoperative, said auxiliary means comprising a spring operatively engageable with said shaft and releasable for rotating said shaft in a direction to retract said seat belt, means for holding said spring in a tensioned state such that said spring tension is not transmitted to said shaft and means which are accessible by a user of said seat belt for manually releasing said spring by disengaging said holding means to transmit said spring tension to said shaft to cause retraction of said seat belt;
wherein, either said first means or said auxiliary means may be used to produce complete retraction of said seat belt.

* * * * *